(12) United States Patent
Yoshida

(10) Patent No.: US 7,293,828 B2
(45) Date of Patent: Nov. 13, 2007

(54) CHILD SEAT WITH DEPLOYABLE SIDE AIRBAGS

(75) Inventor: Ryoichi Yoshida, Shiga (JP)

(73) Assignee: Takata Corporation, Tokyo (JP)

( * ) Notice: Subject to any disclaimer, the term of this patent is extended or adjusted under 35 U.S.C. 154(b) by 474 days.

(21) Appl. No.: 10/830,305

(22) Filed: Apr. 23, 2004

(65) Prior Publication Data

US 2004/0251721 A1    Dec. 16, 2004

(30) Foreign Application Priority Data

Jun. 12, 2003    (JP)    ............................. 2003-167976

(51) Int. Cl.
*B60N 2/42*    (2006.01)

(52) U.S. Cl. ........................... 297/216.11; 297/216.12; 280/730.1

(58) Field of Classification Search ........... 297/216.11, 297/216.12, 250.1; 280/730.2, 730.1, 728.2
See application file for complete search history.

(56) References Cited

U.S. PATENT DOCUMENTS

| | | | |
|---|---|---|---|
| 3,265,438 A | | 8/1966 | Regan et al. |
| 4,402,548 A | * | 9/1983 | Mason ........................ 297/464 |
| 4,592,588 A | | 6/1986 | Isono et al. |
| 4,834,420 A | * | 5/1989 | Sankrithi et al. ......... 280/728.1 |
| 5,292,175 A | | 3/1994 | Artz |
| 5,499,840 A | * | 3/1996 | Nakano .................... 280/730.1 |
| 5,779,304 A | * | 7/1998 | Cunningham .......... 297/216.11 |
| 5,833,312 A | * | 11/1998 | Lenz ...................... 297/216.13 |
| 6,074,003 A | * | 6/2000 | Umezawa et al. ....... 297/216.1 |
| 6,158,812 A | * | 12/2000 | Bonke ........................ 297/391 |
| 6,203,105 B1 | * | 3/2001 | Rhodes, Jr. .............. 297/284.6 |
| 6,213,550 B1 | * | 4/2001 | Yoshida et al. ........ 297/216.13 |
| 6,736,455 B1 | * | 5/2004 | Zakovic et al. ........ 297/256.15 |
| 6,805,404 B1 | * | 10/2004 | Breed .................... 297/216.12 |

FOREIGN PATENT DOCUMENTS

| | | |
|---|---|---|
| DE | 4446595 | 10/1995 |
| DE | 10156621 | 11/2002 |
| DE | 10157707 | 6/2003 |
| EP | 0925997 | 6/1999 |
| EP | 1223074 | 7/2002 |
| FR | 587430 | 4/1925 |
| FR | 1306814 | 10/1962 |
| JP | 64-37743 | 3/1989 |
| JP | 10-157553 | 6/1998 |
| WO | WO91/19623 | 12/1991 |
| WO | WO95/13934 | 5/1995 |

* cited by examiner

*Primary Examiner*—David Dunn
*Assistant Examiner*—Noah Chandler Hawk
(74) *Attorney, Agent, or Firm*—Manabu Kanesaka

(57) ABSTRACT

A child seat includes a seat body having a seat portion, a rear portion, and left and right side panels; airbags to be inflated at sides of a head of a child; and hollow cushions disposed along inner surfaces of the side panels. When an automobile equipped with the child seat collides, the airbags are inflated at the sides of the head of the child, so that an impact applied to the head is absorbed. Furthermore, the cushions absorb a large impact from sides in a side collision and the like. The cushions are preferably disposed below regions where the airbags are inflated. The cushions receive a part of the child other than the head to absorb the impact.

9 Claims, 7 Drawing Sheets

CHILD SEAT WITH DEPLOYABLE SIDE AIRBAGS

BACKGROUND OF THE INVENTION AND RELATED ART STATEMENT

The present invention relates to a child seat placed on a seat of, for example, an automobile, and particularly, to a child seat for protecting a child from a large impact caused by a side collision of an automobile.

A child seat is installed on an automobile seat, and generally includes a seat portion for supporting a hip of a child, a rear portion for supporting a back of the child, and left and right side panels extending along sides of the child.

Japanese Patent Publication (Kokai) No. 10-157553 has disclosed a child seat for protecting a child from a large impact caused by, for example, a side collision of an automobile. According to the protection method disclosed in this reference, airbags are inflatable along outer surfaces of left and right side panels (side supporters).

Japanese Utility Model Publication (Kokai) No. 64-37743 has disclosed a child seat having a horseshoe-shape headrest surrounding a back and two sides of a child head.

In the child seat disclosed in Japanese Patent Publication (Kokai) No. 10-157553, it is necessary to provide a gas generator with a large capacity for inflating the airbags over the entire outer surfaces of the side panels. Furthermore, when a person is seated next to the child seat, one of the airbags is inflated between the person and the child seat, and may apply an unexpected external force to the person.

In the child seat disclosed in Japanese Utility Model Publication (Kokai) No. 64-37743, the headrest around the child head may cause discomfort to the child.

In view of the problems described above, an object of the present invention is to provide a child seat with a simple structure for securely protecting a child.

Further objects and advantages of the invention will be apparent from the following description of the invention.

SUMMARY OF THE INVENTION

According to a first aspect of the present invention, a child seat includes a seat body having a seat portion, a rear portion, and left and right side panels; airbags to be inflated at sides of a head of a child; and hollow cushions disposed along inner surfaces of the side panels. When an automobile equipped with the child seat collides, the airbags are inflated at the sides of the head of the child, so that an impact applied to the head is absorbed. Furthermore, the cushions absorb a large impact from sides in a side collision and the like.

The cushions are preferably disposed below regions where the airbags are inflated. The cushions receive a part of the child other than the head to absorb an impact.

The airbags may have a size to be inflated over the sides of the head of the child. Accordingly, when inflation means is provided with a sensor for detecting a collision and gas supplying means for inflating an airbag in response to a detection signal from the sensor, the gas supplying means does not need to have a large capacity.

According to the present invention, it may be configured that the cushions supplies gas therein to inflate the airbags. In this case, when the cushions receive a load from sides upon a side collision, the gas inside the cushions is supplied to the airbags so that the airbags are inflated over the regions covering the sides of the child head. Accordingly, it is not necessary to provide gas supplying means for inflating the airbags. The gas is moved (discharged) from the cushions to the airbags when the load is applied to the cushions, thereby further absorbing the impact.

According to the present invention, the cushion may include a gasbag filled with gas. The gasbag is lightweight and suitable for the cushion of the child seat. In this case, gas discharging means may be provided for discharging the gas inside the gasbag toward the airbag when a gas pressure inside the gasbag exceeds a predetermined value. Accordingly, the airbag is inflated only when the child is pressed against the gasbag with a force larger than a predetermined pressure.

The child seat may include a check valve for preventing the gas from flowing from the airbag to the gasbag, thereby maintaining the internal pressure of the airbag for a long period of time.

According to the present invention, each of the left and right side panels may be provided with the airbag and the cushion, and the cushion on one of the panels can supply gas to the airbags on both panels, thereby preventing the child head from rebounding.

Shape-maintaining means may further be provided for maintaining a shape of the cushion until a pressing force applied to the cushion reaches a predetermined value. Accordingly, a small pressing force will not deform the cushion. The shape-maintaining means includes a spacer having a simple structure.

According to the present invention, inflation-shape regulating means may be provided for regulating an inflated shape of the airbag. The inflation-shape regulating means includes a tether strap. With the inflation-shape regulating means, the airbag is inflated in a shape and size corresponding to a space between the child seat and the child head.

According to the present invention, venting means may be provided for discharging the gas inside the airbag to absorb an impact. The venting means may include a vent hole provided in the airbag. However, the venting means is not limited to the vent hole. With the venting means, it is possible to absorb a larger amount of impact.

According to the present invention, a child seat includes a seat body having a seat portion for seating a child, a rear portion, and left and right side panels; and cushions disposed along inner surfaces of the side panels. The cushions are provided along the inner surfaces of the side panels in advance. Accordingly, it is not necessary to provide a mechanism for rapidly inflating a side-panel airbag during a collision as disclosed in Japanese Patent Publication (Kokai) No. 10-157553, thereby making the child seat simple.

The cushion may include a lightweight gasbag filled with gas. The child seat may include venting means for discharging the gas inside the gasbag when a pressure inside the gasbag exceeds a predetermined value. The venting means allows the gasbag to substantially absorb an impact even when a large impact is applied to the gasbag. When the venting means of the gasbag is not operated in an automobile collision due to only a small impact on the gasbag, the child seat may be used continuously without repair.

According to the present invention, at least one of the side panels may include a plurality of cushions. In this case, even when only one of the cushions receives a pressing force, the gas pressure inside the cushion rises to generate a reactive force against the child or discharge the gas from the cushion to the airbag.

BRIEF DESCRIPTION OF THE DRAWINGS

FIGS. 3(a) and 3(b) are sectional views taken along line 3(a)-3(a) in FIG. 1, wherein FIG. 3(a) is a view in a state before the airbag is inflated and FIG. 3(b) is a view in a state that the airbag is inflated;

FIGS. 4(a) and 4(b) are horizontal sectional views of an upper portion of a child seat according to a second embodiment of the present invention, wherein FIG. 4(a) is a view in a state before an airbag is inflated and FIG. 4(b) is a view in a state that the airbag is inflated;

DETAILED DESCRIPTION OF PREFERRED EMBODIMENTS

Figure 1:
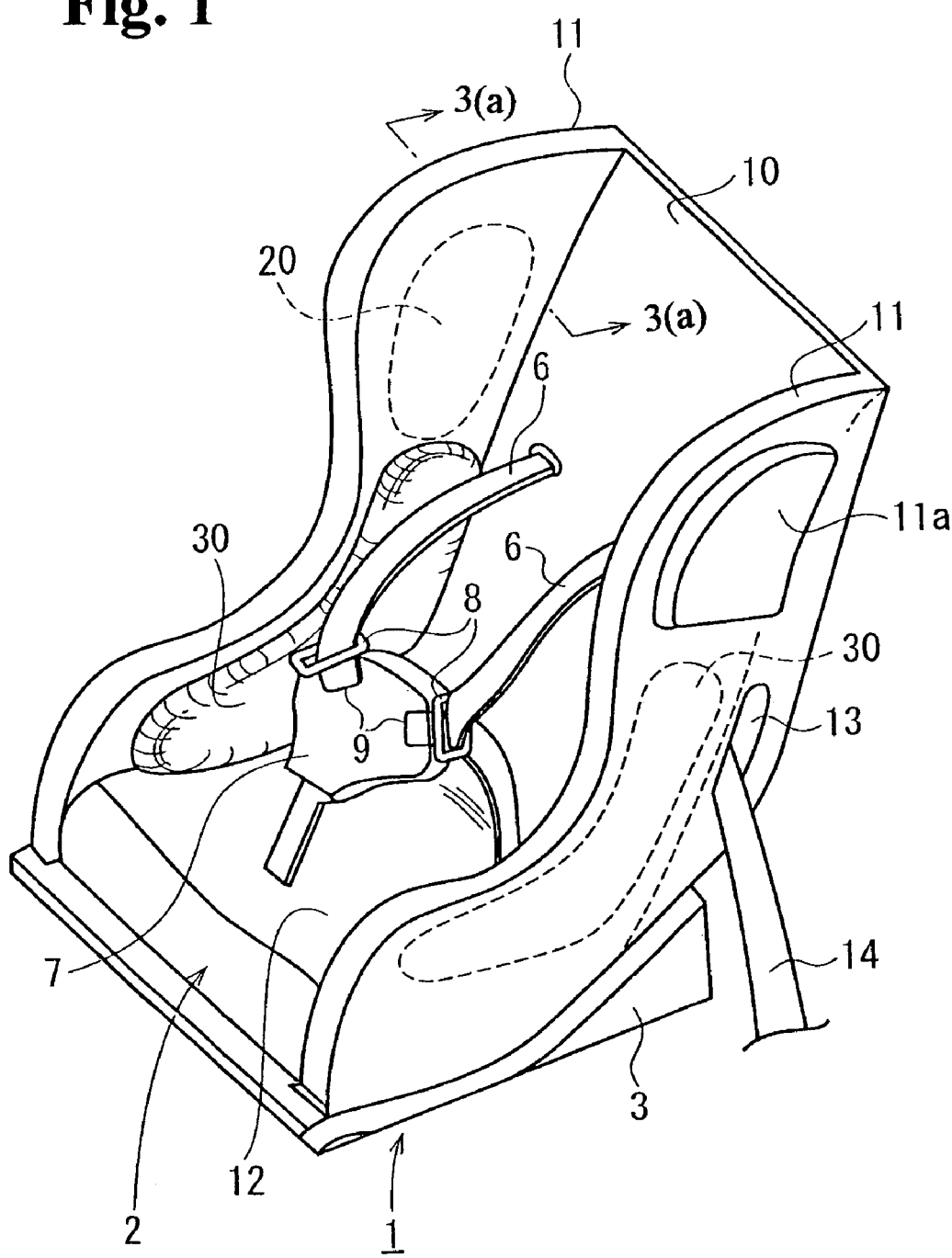
FIG. 1 is a perspective view of a child seat according to a first embodiment of the present invention.
Figure 2:
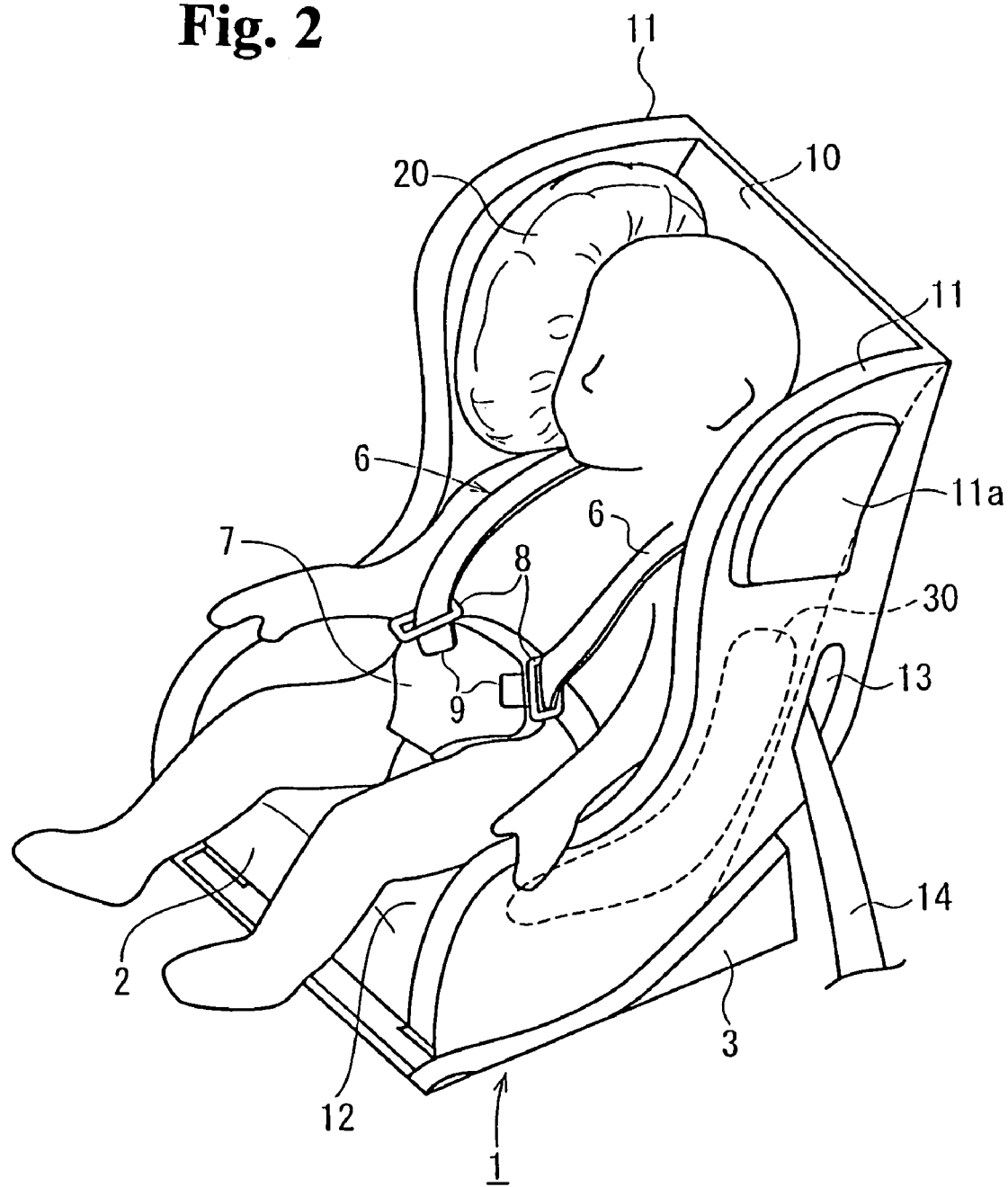
FIG. 2 is a perspective view of the child seat shown in FIG. 1 in a state that an airbag is inflated.
Figure 3A:
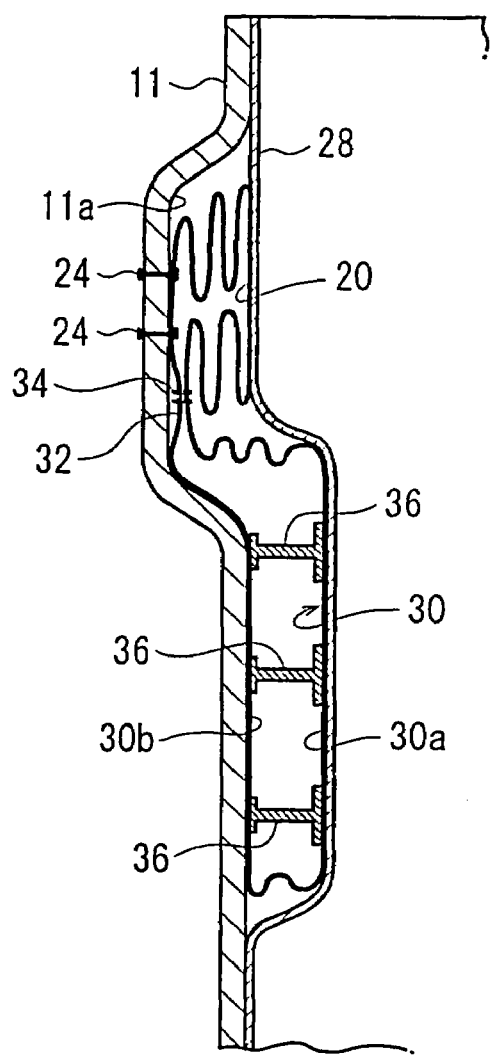
Figure 3B:
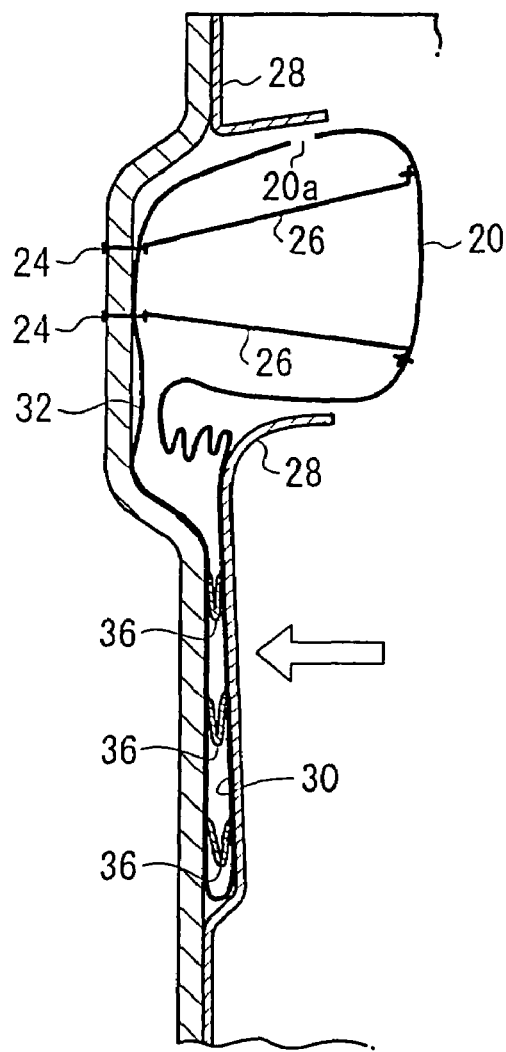

Hereunder, embodiments of the present invention will be described with reference to the accompanying drawings. FIG. 1 is a perspective view of a child seat according to a first embodiment. FIG. 2 is a perspective view of the child seat shown in FIG. 1 in a state that an airbag is inflated. FIGS. 3(a) and 3(b) are sectional views taken along line 3(a)-3(a) in FIG. 1, wherein FIG. 3(a) is a view in a state before the airbag is inflated and FIG. 3(b) is a view in a state that the airbag is inflated.

Referring to FIG. 1, a child seat 1 includes a seat body 2 for seating a child and a base 3 for supporting the seat body 2 in a reclined state. The seat body 2 includes a seat portion 12 for supporting a bottom of the child; a rear portion 10 for supporting a back and a head of the child; and side panels 11 having a wall-like structure extending forward from left and right sides of the rear portion 10. The side panels 11 extend from both sides of the rear portion 10 to both sides of the seat portion 12.

The seat body 2 is provided with two child seat belts 6 for restraining the child. Each of the child seat belts 6 passes through a belt tongue 8. A chest pad 7 is vertically arranged in front of the seat portion 12. The chest pad 7 is provided with two buckles 9 for latching the belt tongues 8.

Rear ends of the seat belts 6 pass through the rear portion 10 and are wound in seatbelt retractors (not shown) equipped with emergency locking mechanisms provided inside the seat body 2. The retractors are locked upon an automobile collision to prevent the seat belts 6 from withdrawing. The seatbelt retractors may be omitted.

The child seat 1 is secured to an automobile seat (not shown) by an adult seatbelt 14. Reference numeral 13 indicates one of belt-holes through which the adult seatbelt 14 passes. When the child seat 1 is used, a child sits on the seat body 2, and the seat belts 6 are strapped over the child followed by inserting the belt tongues 8 into the buckles 9.

In the first embodiment, airbags 20 are disposed in airbag holders 11a at upper portions of the left and right side panels 11 corresponding to sides of the head of the child seated in the child seat 1. The holders 11a are recesses provided in inner surfaces (surfaces facing the child head) of the side panels 11.

The airbags 20 are housed in the airbag holders 11a in a folded state. The airbag 20 is mounted on the side panel 11 with fasteners 24 such as rivets. The fasteners 24 are connected to distal ends of the airbag 20 in an inflating direction with tether straps 26.

Referring to FIGS. 2 and 3(b), the airbag 20 has a size in an inflated state over only the side of the head of the child seated in the child seat 1. The airbag 20 is provided with a vent hole 20a (FIG. 3(b)) for discharging gas.

The side panel 11 is provided with a cover sheet 28 at an inner surface thereof for covering the airbag 20 in a folded state and the holder 11a. When the airbag 20 is inflated, the cover sheet 28 is torn by a pressing force of the airbag 20 to open the holder 11a.

In the first embodiment, the side panel 11 is provided with a hollow cushion 30 on the inner surface thereof below the airbag 20. The airbag 20 and the cushion 30 communicate with each other through a duct 32. The duct 32 is blocked with blocking means 34 such as a tear seam. When the gas pressure inside the cushion 30 exceeds a certain value, the blocking means 34 is opened to discharge gas from the cushion 30 to the airbag 20.

The cushion 30 is disposed substantially over the whole inner surface of the side panel 11 below the airbag 20. The cushion 30 contains gas with a pressure higher than the atmospheric pressure (for example, 1.5 to 3 atm).

A surface 30a of the cushion 30 facing the child is formed of a semi-rigid synthetic resin. Spacers 36 are disposed between the surface 30a and opposing surface 30b adjacent to the side panel 11. When a load applied to the cushion 30 exceeds a certain value, the spacers 36 are compressed to reduce a volume of the cushion 30.

According to the child seat 1, the cushions 30 receive a body part such as a shoulder, torso, waist, and thigh of the child seated in the seat 1 upon a side collision of an automobile. When the load applied to the cushion 30 exceeds a certain value, the spacers 36 are bent. The pressure inside the cushion 30 exceeds a certain value to open the blocking means 34, and the gas inside the cushion 30 is discharged towards the airbag 20. The volume of the cushion 30 is reduced, so that the impact given to the body of the child is absorbed.

Referring to FIG. 3(b), when the gas is discharged from the cushion 30 to the airbag 20, the airbag 20 opens the cover sheet 28. Consequently, the airbag 20 is inflated between the side panel 11 and the child head for receiving the head and absorbing the impact given to the head.

According to the child seat 1, the cushions 30 absorb the impact caused by the load applied to the child from the sides upon a side collision. Furthermore, the airbags 20 are inflated between the child and the side panels 11 for receiving the head. The gas in the airbag 20 is discharged outwardly through the vent hole 20a, so that the impact given to the child head is absorbed.

In the first embodiment, when a load is applied to one of the cushions 30, the volume of the cushion 30 is reduced, thereby supplying the gas inside the cushion 30 to the airbag 20 to inflate the airbag 20. Accordingly, airbag inflating means such as an inflator is not necessary.

In the child seat 1, the airbags are not inflated outwardly from the two sides of the seat body 2. Accordingly, a person next to the seat 1 does not receive an unexpected external force from the child seat 1. Furthermore, if a person hits against the child seat 1, the cushion 30 absorbs the impact.

In this embodiment, the cushion 30 is filled with gas having a pressure higher than the atmospheric pressure. The gas in the cushion 30 may have the atmospheric pressure. Furthermore, the duct 32 may be provided with a check valve to prevent the gas from flowing from the airbag 20 to the cushion 30.

Figure 4A:
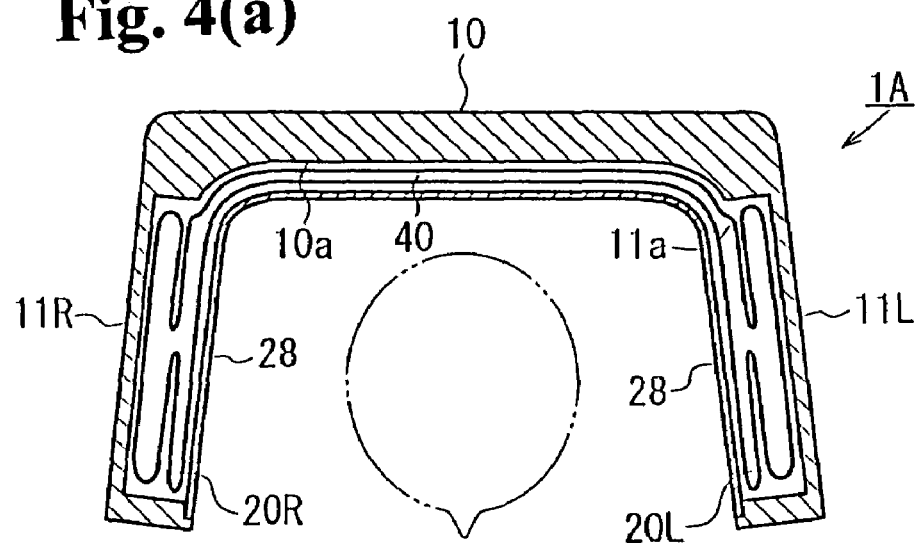
Figure 4B:
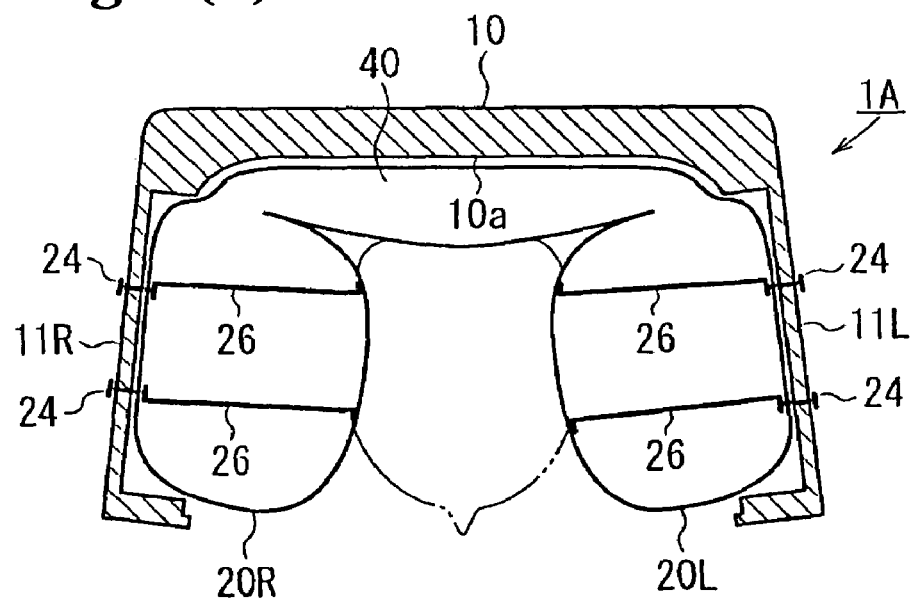

FIGS. 4(a) and 4(b) are horizontal sectional views of an upper portion of a child seat according to a second embodiment of the present invention, wherein FIG. 4(a) is a view in a state before an airbag is inflated and FIG. 4(b) is a view in a state that the airbag is inflated.

In the second embodiment, a left airbag 20L and a right airbag 20R are provided on upper inner surfaces of side panels 11L and 11R, respectively. Furthermore, the cushions 30 (not shown in FIGS. 4(a) and 4(b)) are provided on the inner surfaces of the side panels 11L and 11R below the airbags 20L and 20R. The cushion on the left side panel 11L communicates with the airbag 20L through a duct, while the cushion on the right side panel 11R communicates with the airbag 20R through a duct.

In the second embodiment, the two airbags 20L and 20R communicate with each other through a duct 40. The duct 40 has a flexible hose-like structure. When gas does not pass through the duct 40, the duct 40 has either a flat shape or a tubular shape with a small diameter. On the other hand, when gas passes through the duct 40, the duct 40 is inflated to increase the diameter. Alternatively, the duct 40 may be formed of a non-inflatable tubular material.

The rear portion 10 has a groove 10a at a front surface thereof for retaining the duct 40 in a deflated state. The groove 10a extends laterally across the front surface of the rear portion 10. Two ends of the groove 10a are connected to the airbag holders 11a provided on the inner surfaces of the side panels 11L and 11R.

The airbags 20L and 20R are folded and housed inside the corresponding airbag holders 11a, and the duct 40 is housed inside the groove 10a. The cover sheet 28 is disposed over the inner surfaces of the side panels 11L and 11R for covering the front surface of the rear portion 10, the airbags 20L and 20R and the duct 40. When the airbags 20L and 20R and the duct 40 are inflated, the cover sheet 28 is torn to open by a pressing force.

Other components of the child seat 1A are similar to those of the child seat 1 shown in FIGS. 1 to 3(a) and 3(b). In FIGS. 4(a) and 4(b), the airbags 20L and 20R are provided with tether straps 26 and a vent hole (not shown) as in the airbag 20.

In the child seat 1A, when a load applied to one of the cushions 30 exceeds a certain value upon a side collision of an automobile, the spacers 36 in the cushion 30 are deformed so that the gas is discharged from one of the cushion 30 to the corresponding airbags 20L and 20R. Furthermore, through the duct 40, the gas inside one of the airbags 20L and 20R flows to the other one of the airbags 20R and 20L. Consequently, as shown in FIG. 4(b), the airbags 20L and 20R are inflated between the child head and the side panels 11L and 11R for receiving the head from both sides to absorb an impact applied to the child head. Furthermore, as shown in FIG. 4(b), the duct 40 is also inflated behind the child head for receiving the back of the head so that the impact is absorbed.

According to the child seat 1A, the cushions 30 absorb the impact caused by the load applied from sides upon a side collision. Furthermore, the airbags 20L and 20R absorb the impact applied to the child head.

Figure 5:
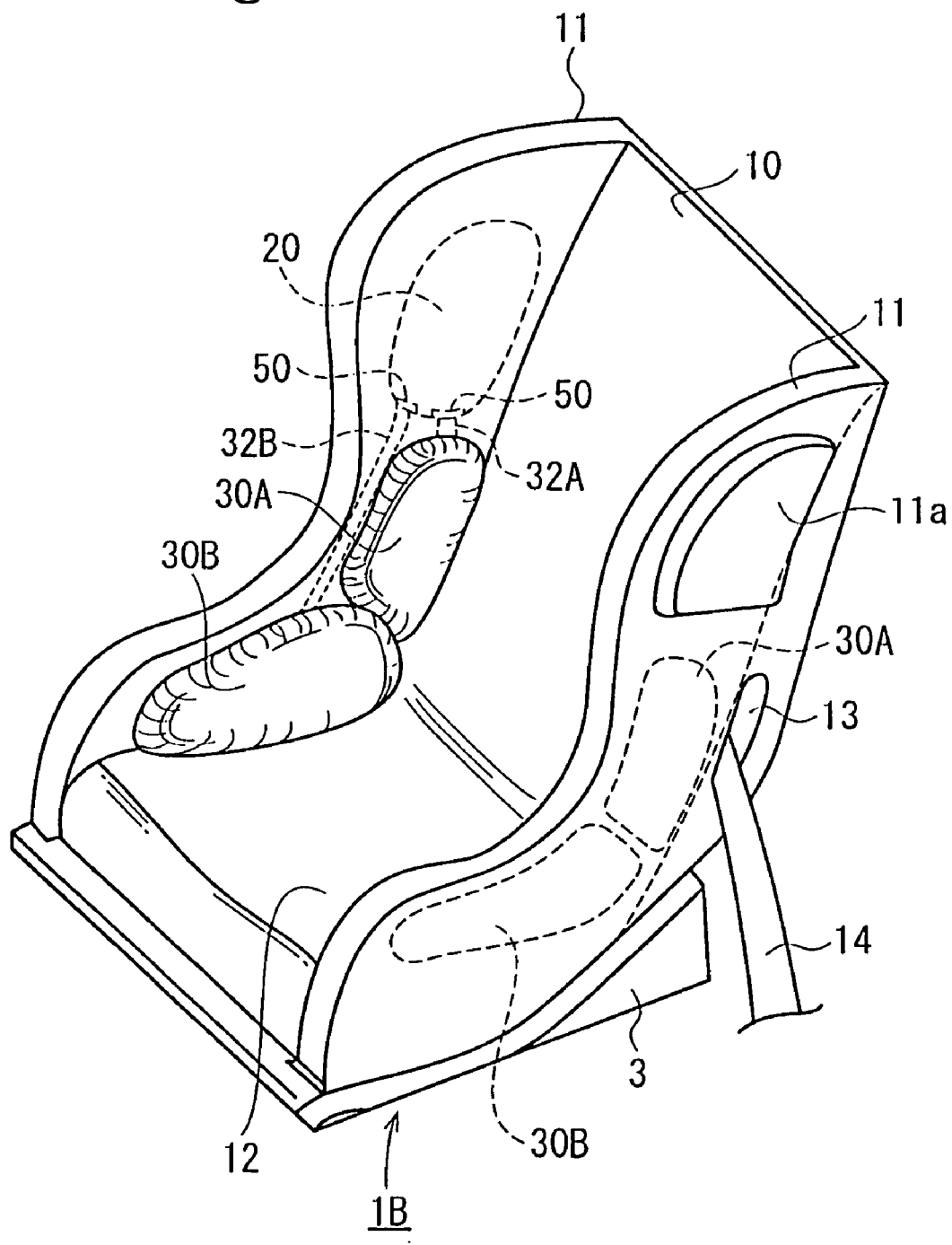
FIG. 5 is a perspective view of a child seat according to a third embodiment of the present invention.

FIG. 5 is a perspective view of a child seat 1B according to a third embodiment of the present invention. In the third embodiment, each of the side panels 11 is provided with two cushions 30A and 30B at the inner surfaces thereof below the airbag 20. The cushion 30A is disposed above the cushion 30B. The cushions 30A and 30B communicate with the airbag 20 disposed above the cushions 30A and 30B through respective ducts 32A and 32B. Each of the ducts 32A and 32B is provided with blocking means 34 (not shown in FIG. 5) for blocking the duct 32A or 32B until a gas pressure inside the corresponding cushions 30A and 30B exceeds a certain value.

Furthermore, each of the ducts 32A and 32B is provided with a check valve 50 for preventing backflow of the gas from the airbag 20 to the corresponding cushions 30A and 30B.

Other components of the child seat 1B are similar to those of the child seat 1 shown in FIGS. 1 to 3(a) and 3(b). In FIG. 5, the child seat belts 6, the chest pad 7, and the buckles 9 are omitted to show the airbag and the cushions clearly. These components are included in the child seat 1B. The cushions 30A and 30B have a structure same as that of the cushion 30.

According to the child seat 1B, when at least one of the cushions 30A and 30B receives a pressing force upon a collision such that the gas pressure in the cushion exceeds a certain value, the gas is supplied to the airbag 20 from the cushion to inflate the airbag 20, as shown in FIG. 2. Accordingly, the impact applied to the body and the head of the child is absorbed.

After the gas is supplied to the airbag 20 from both of the cushions 30A and 30B, even if the gas pressure in one of the cushions 30A and 30B becomes lower than the pressure inside the airbag 20, the check valve 50 prevents backflow of the gas from the airbag 20 to the cushion. Accordingly, the internal pressure of the airbag 20 is maintained high. Alternatively, the two airbags may be connected with each other through a duct as shown in FIGS. 4(a) and 4(b).

According to the embodiments described above, the cushions and the airbags inflated by the gas supplied from the cushions absorb the impact. In the present invention, the airbags may be omitted like a child seat 1C of a fourth embodiment shown in FIG. 6. In this case, a cushion 30C may be disposed on the inner surface of the side panel 11 such that the cushion 30C extends to the upper inner surface. The cushion 30C is provided with spacers and has an internal structure same as that of the cushion 30. The cushion 30C is filled with atmospheric gas and is provided with a vent hole (not shown).

When the body or the head of the child hits against the cushion 30C upon a collision, the spacers in the cushion 30C are deformed so that the volume of the cushion 30C is reduced. The gas inside the cushion 30C is discharged through the vent hole, thereby absorbing the impact.

Figure 6:
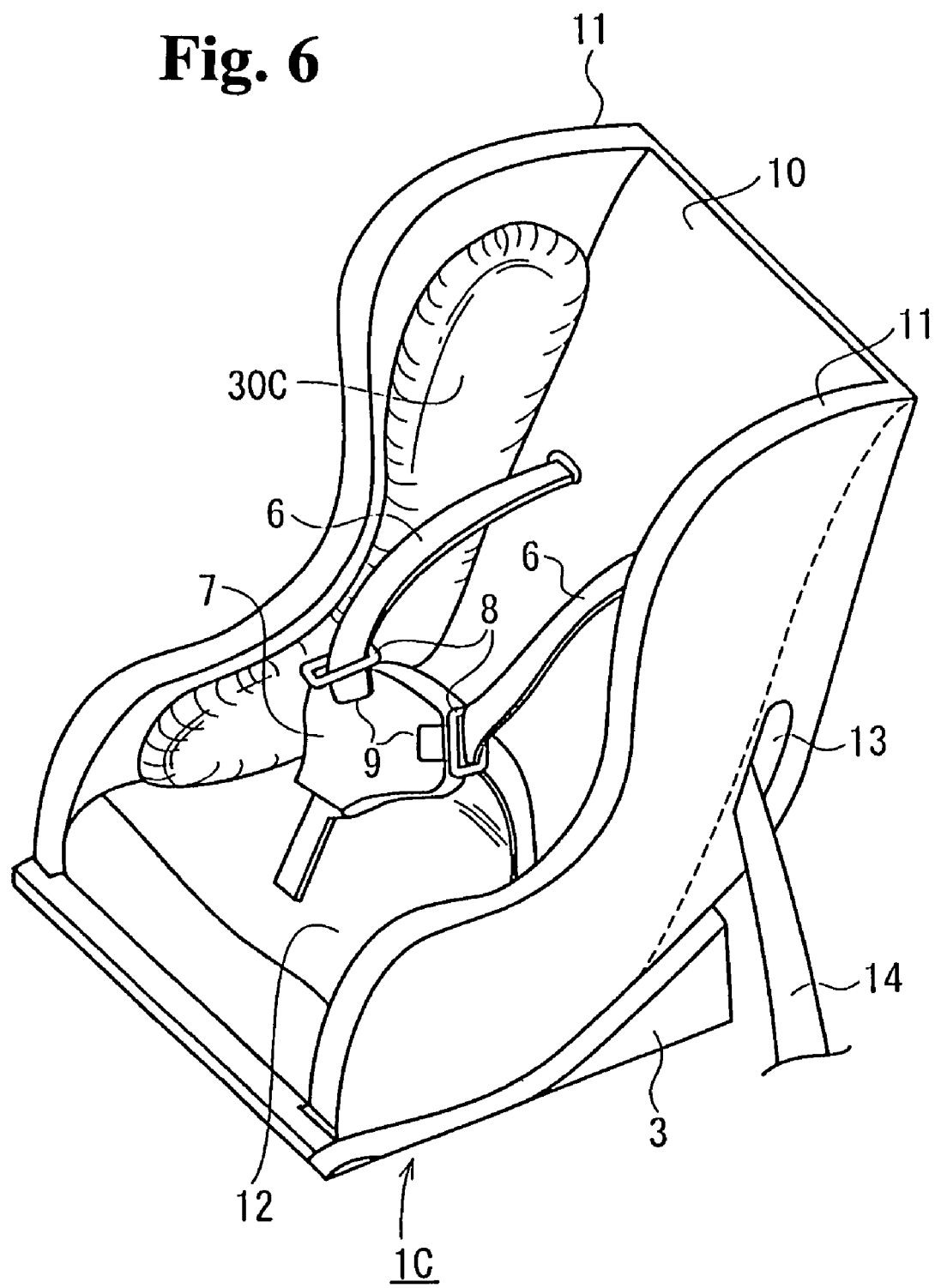
FIG. 6 is a perspective view of a child seat according to a fourth embodiment of the present invention.

One cushion 30C is provided on each of the side panels 11 in FIG. 6, and two or more cushions may be provided. Furthermore, the interior of the cushion 30C may be separated into multiple chambers.

The cushion 30C may contain gas with a pressure higher than the atmospheric pressure (for example, 1.1 to 3 atm). Furthermore, the vent hole may be provided with pressure-holding means such as a valve or a tear seam for blocking the hole until the pressure in the cushion 30C reaches a predetermined value.

Figure 7A:
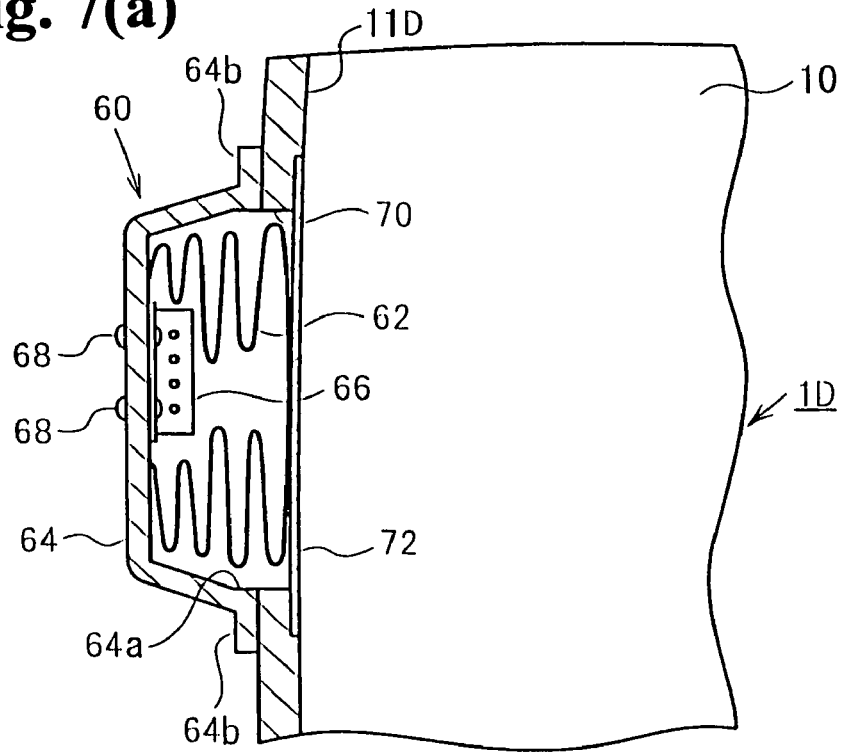
FIGS. 7(a) and 7(b) are longitudinal sectional views of a child seat according to a fifth embodiment of the present invention.
Figure 7B:
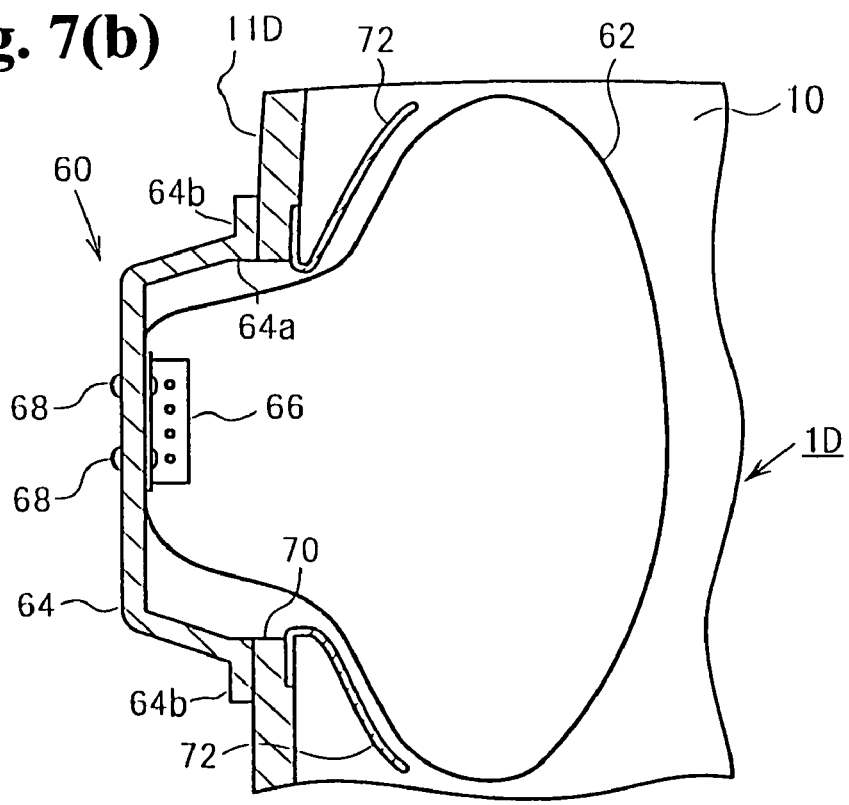

Although the airbags are inflatable using the gas from the cushions shown in FIGS. 1 to 5, an inflator may alternatively be provided for inflating the airbags. FIGS. 7(a) and 7(b) are longitudinal sectional views of an upper portion of one of side panels of a child seat 1D provided with an airbag device 60 having an inflator according to a fifth embodiment.

The airbag device 60 includes an airbag 62, a casing 64 for housing the airbag 62, an inflator 66 for inflating the airbag 62, and a sensor (not shown) for detecting an automobile collision. The casing 64 has a side opening 64a. The airbag 62 is folded and housed inside the casing 64. The inflator 66 discharges gas in response to a detection signal from the sensor.

Referring to FIG. 7(*b*), the airbag 62 has an inflatable size over the side of the head of the child seated in the child seat 1D like the airbag 20. The airbag 62 is provided with a vent hole (not shown).

In the fifth embodiment, the inflator 66 is mounted on the casing 64 and disposed inside the airbag 62. Reference numeral 68 indicates fasteners such as rivets for mounting the inflator 66 on the casing 64. A base of the airbag 62 is disposed between a flanged portion of the inflator 66 and the casing 64.

Upper portions of the two side panels 11D are provided with airbag-inflation openings 70 facing sides of the head of the child seated in the child seat 1D. As shown in FIG. 7(*a*), the airbag device 60 is disposed on the outer side surface of the side panel 11D such that the side opening 64*a* of the casing 64 corresponds to the opening 70. A flange 64*b* protrudes from an edge of the side opening 64*a* of the casing 64. The flange 64*b* is disposed along an edge of the opening 70 so as to be mounted on the side panel 11D.

A cover sheet 72 is disposed over the opening 70 on the inner surface of the side panel 11D. When the airbag 62 is inflated, a pressing force of the airbag 62 tears the cover sheet 72 to open the opening 70.

According to the child seat 1D, when an automobile collides, the sensor of the airbag device 60 detects the collision. The inflator 66 discharges gas in response to the detection signal from the sensor. As shown in FIG. 7(*b*), the gas from the inflator 66 inflates the airbag 62 and tears the cover sheet 72 to open. Accordingly, the airbags 62 are inflated between the sides of the child head and the side panels 11D.

The embodiments described above are only examples of the present invention, and the present invention is not limited to the embodiments shown in the drawings.

As described above, the present invention provides a child seat with a simple structure for securely protecting the child.

While the invention has been explained with reference to the specific embodiments of the invention, the explanation is illustrative and the invention is limited only by the appended claims.

What is claimed is:

1. A child seat for protecting a child, comprising:
   a seat body having a seat portion, a rear portion, and left and right side panels,
   an airbag provided on an inner upper side of at least one of the side panels of the seat body defined between the left and right side panels, and
   a cushion having a hollow body disposed on an inner surface of at least one of the side panels under the airbag inside seat body, said cushion being filled with gas and connected to the airbag so that when the cushion is pushed above a predetermined value, said cushion provides gas filled in the hollow body to the airbag to inflate the airbag,
   wherein said cushion is disposed below an area where the airbag is inflated and projects inwardly from one of the side panels in a state that the airbag is not inflated;
   said airbag and cushion are provided on each inner side of the side panels; and
   said airbags provided on the side panels are connected together horizontally through a duct, said duct being inflated when the airbags are inflated.

2. A child seat according to claim 1, wherein said cushion includes a gasbag filled with the gas.

3. A child seat according to claim 2, wherein said gasbag includes a gas discharging device for discharging the gas in the gasbag toward the airbag when a gas pressure inside the gasbag exceeds the predetermined value.

4. A child seat according to claim 1, wherein said cushion includes a shape-maintaining device for maintaining a shape of the cushion until a pressing force applied to the cushion reaches a predetermined value.

5. A child seat according to claim 4, wherein said shape-maintaining device includes a spacer.

6. A child seat according to claim 1, wherein said airbag includes an inflation-shape regulating device for regulating a shape of the airbag in an inflated state.

7. A child seat according to claim 6, wherein said inflation-shape regulating device includes a tether strap.

8. A child seat according to claim 1, wherein said airbag includes a venting device for discharging the gas inside the airbag.

9. A child seat for protecting a child, comprising:
   a seat body having a seat portion, a rear portion, and left and right side panels,
   an airbag to be inflated at an inner upper side of the seat body defined between the left and right side panels, and
   a cushion having a gasbag disposed on an inner surface of at least one of the side panels, said gasbag being filled with gas to be supplied to the airbag,
   wherein said gasbag includes a gas discharging device for discharging the gas in the gasbag toward the airbag when a gas pressure inside the gasbag exceeds a predetermined value, and a check valve for preventing the gas from flowing from the airbag to the gasbag.

* * * * *